United States Patent

Spooner et al.

[11] Patent Number: 5,609,073
[45] Date of Patent: Mar. 11, 1997

[54] CAMMING DIFFERENTIAL WITH OIL PUMP MEANS

[75] Inventors: John Spooner, Leamington Spa; Alastair J. Young, Kenilworth; John P. Chippendale, Knowle, all of Great Britain

[73] Assignee: Automotive Products, plc, Leamington Spa, England

[21] Appl. No.: 244,950

[22] PCT Filed: Oct. 15, 1993

[86] PCT No.: PCT/GB93/02137

§ 371 Date: Sep. 28, 1994

§ 102(e) Date: Sep. 28, 1994

[87] PCT Pub. No.: WO94/09291

PCT Pub. Date: Apr. 28, 1994

[30] Foreign Application Priority Data

Oct. 16, 1992 [GB] United Kingdom ............. 9221817

[51] Int. Cl.⁶ ............................. F16H 48/14; F16H 57/04
[52] U.S. Cl. ........................... 74/650; 184/11.2; 184/11.4; 184/13.1
[58] Field of Search ............................. 74/650; 184/11.2, 184/11.4, 13.1

[56] References Cited

U.S. PATENT DOCUMENTS

| | | | |
|---|---|---|---|
| 3,796,283 | 3/1974 | Raby | 184/11.2 |
| 4,018,097 | 4/1977 | Ross | 184/11.2 X |
| 4,312,900 | 1/1982 | Simpson | 427/181 |
| 4,468,981 | 9/1984 | Ries | 74/713 |
| 5,184,583 | 2/1993 | Grell | 123/90.51 |
| 5,299,881 | 4/1994 | Mettler-Friedli | 74/567 |

FOREIGN PATENT DOCUMENTS

| | | |
|---|---|---|
| 624970 | 6/1949 | United Kingdom. |
| 2004001 | 3/1979 | United Kingdom. |

*Primary Examiner*—Charles A. Marmor
*Assistant Examiner*—Nathan O. Jensen
*Attorney, Agent, or Firm*—Paul E. Milliken; Lee A. Germain

[57] ABSTRACT

A differential mechanism (10) having two output cam members (16, 17) rotatable about an axis (A) each cam member having an annular cam surface of undulating form comprising pairs of mutually inclined surfaces (24, 25; 26, 27). The inclined surfaces are engaged by end surfaces (29, 30) of cam followers (28) so that relative contra rotation of the output cam members (16, 17) causes the cam followers to slide axially. An input element (11–14) engages and supports the followers (28) and moves the followers circumferentially relative to the output cam members and a component (11, 14) of the differential which rotates during use of the differential drives oil pump means (70) for forcing oil into the differential.

26 Claims, 7 Drawing Sheets

CAMMING DIFFERENTIAL WITH OIL PUMP MEANS

The invention relates to a differential mechanism particularly but not exclusively for use in motor vehicles.

Differential mechanisms commonly used on vehicles are of the sun and planet gear type and have a well known disadvantage that when one wheel is on a slippery surface such as mud or ice and the other wheel is on a firm surface capable of providing traction, the first wheel will simply spin as it receives all the available power transmitted to the differential.

Limited slid differential mechanisms have been proposed in an attempt to overcome this problem which restrict the extent to which one wheel can spin relative to the other but such differentials are more complex and, therefore, more costly to produce.

In European patent application EP-A-0284329 there is proposed an alternative differential mechanism comprising two output cam members rotatable about an axis, with each cam member having a single annular cam surface thereon of undulating form comprising pairs of mutually inclined surfaces, and a plurality of cam followers having end surfaces engaging the cam surfaces of the output cam members, the arrangement being such that relative contra rotation of said output cam members causes the cam followers to slide axially, and an input element engaging and supporting the followers and moving the followers circumferentially relative to the output cam members.

Such a differential will hereinafter be called a differential of the type described.

It is desirable to lubricate the relatively moving surfaces within such a differential to keep wear to a minimum.

According to the invention there is provided a differential of the type described, characterised in that a component of the differential which rotates during use of the differential drives oil pump means for forcing oil into the differential.

The oil pump means may comprise scoops arranged externally on the component which rotates and connected with oil massageways through the component.

The component which rotates and which drives the oil pump means may be the input element of the differential.

In an alternative construction the oil pump means comprises an oil pump.

The oil pump may conveniently comprise a non-rotatable housing containing an impellor mounted on an outer surface of the input member.

Also according to the invention there is provided a differential of the kind described, wherein each output cam member has oil passageways formed therein.

The invention also provides a method of manufacture of a steel cam member having a cam surface thereon, wherein the whole member is case hardened and is subsequently treated by a salt bath nitrocarburizing process, and thereafter selected surfaces of said cam member are induction hardened.

Differential mechanisms in accordance with the invention will now be described by way of example with reference to the accompanying drawings in which.

In FIGS. 1 to 4 the differential 10 is housed in a surrounding casing (not shown) partially filled with oil and comprises a drive input housing 11 in the form of a gear 12 which receives drive from a pinion (not shown) in known manner. The gear 12 is drivably connected to hubs 13 and 14 which are held in the housing by any suitable means such as screwing into the housing 11 and then locking in position by any suitable means such as peening, welding or circumferentially spaced bolts.

Figure 1:
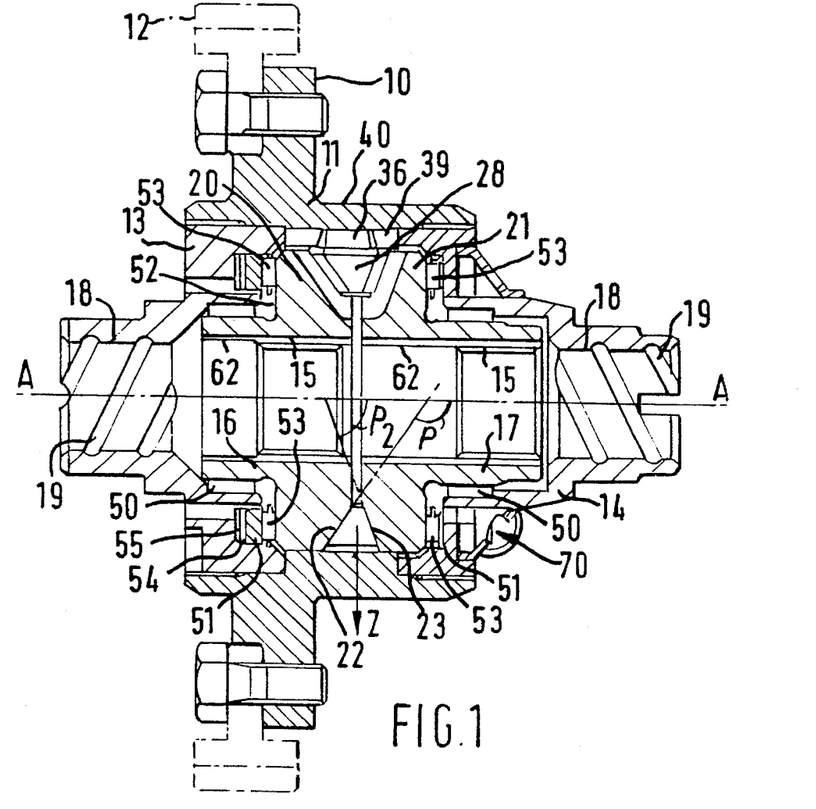
FIG. 1 is a cross section through a differential mechanism in accordance with the invention taken through output cam members.

Two output cam members 16, 17 each have a central bore 62 with splines 15 therein, to drive output shafts (not shown) extending through bores 18 in the hubs 13, 14. The bores 18 each have a helical oil feed groove 19 on the inner surface thereof which, when the differential is in use, feed lubricant from the casing into the differential.

The output cam members 16, 17 are rotatable in bearings 50 about an axis A relative to the hubs. The output members 16, 17 have respective flanges 20, 21 thereon on which are formed respective undulating face cams 22, 23. The cam 22 comprises an annular zigzag surface (shown in detail in FIG. 3) made up from seven pairs of mutually inclined helical surfaces 24, 25. The cam 23 also comprises an annular zigzag surface, apparent from FIG. 3, but is made up from eight pairs of mutually inclined helical surfaces 26,27. As shown in FIG. 1, the undulating cam surface 22 is inclined at an angle P to the axis A and the cam surface 23 is inclined at angle P2 to the axis A whereby each cam surface converges towards the other.

Fifteen cam followers 28 are positioned between the cams 22,23. Each cam follower is of strut-like elongate form and comprises two sets of mutually inclined end surfaces 29,30 and 32, 33 which terminate at relatively longer side surfaces 34,35. The angle of inclination Q between the end surfaces 29,30 corresponds to the angle of inclination between the cam surfaces 24,25 and the angle of inclination S between the end surfaces 32,33 corresponds to the angle of the inclination between the cam surfaces 26,27. The end surfaces 29,30 are also inclined at angle P and the end surfaces 32,33 are inclined at angle P2 as apparent from FIG. 1. The angles P and P2 may be the same.

Figure 2:
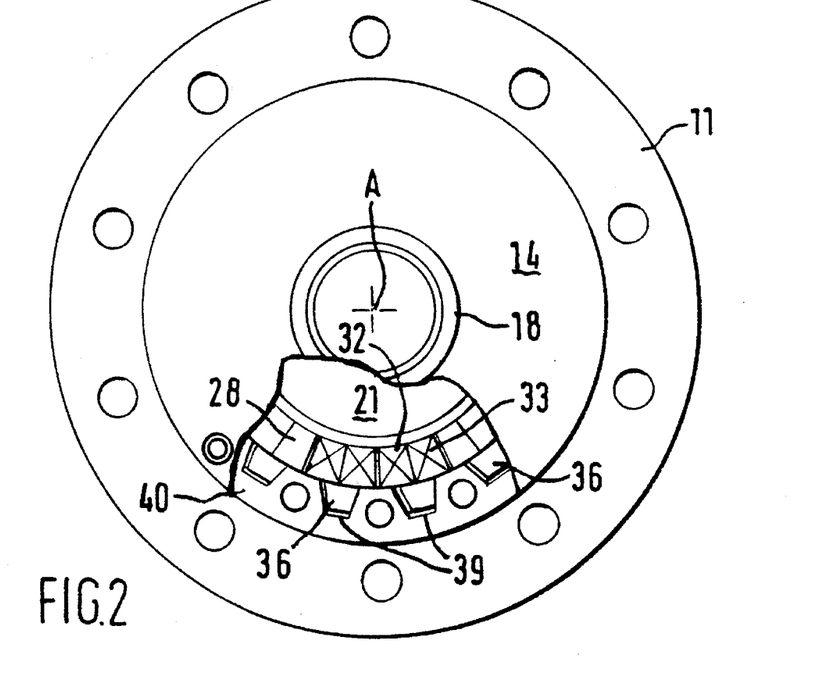
FIG. 2 is an end view of the differential of FIG. 1 shown partly broken away.

When viewed from the end each cam follower is arcuate which enables the followers to be assembled together as viewed in FIG. 2. Each cam follower has an arcuate embrace of substantially 360/nf degrees where nf is the number of cam followers. However, if desired, the arcuate embrace may be less to leave clearance spaces 28' (See FIG. 4) between the followers.

Figure 4:
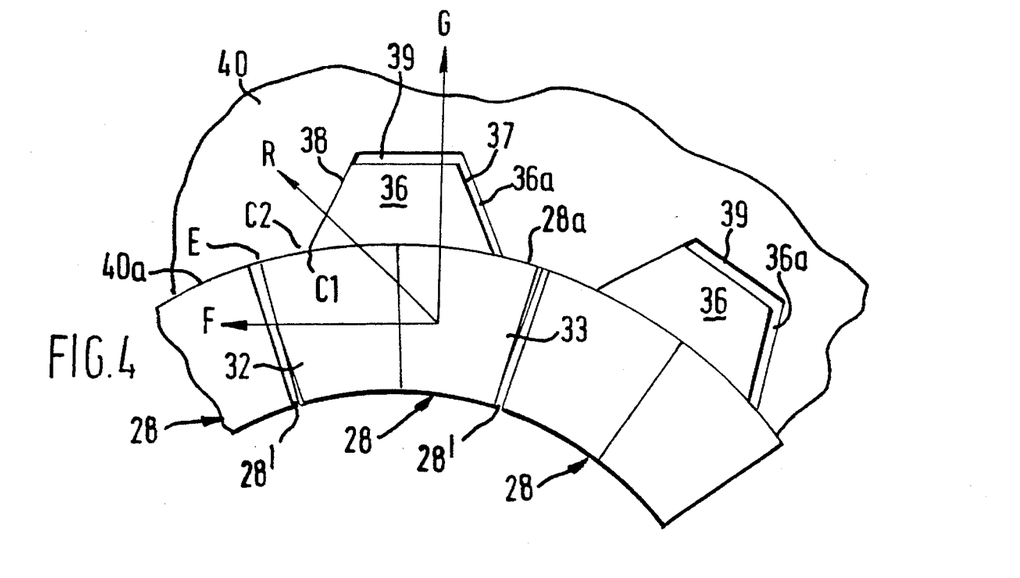
FIG. 4 is a diagrammatic end view of a cam follower.

Each cam follower includes an elongate drive dog 36 having mutually inclined side surfaces 37,38 (FIG. 4). The drive dogs 36 locate with slight clearance 36a in complementary shaped grooves 39 formed in the inner periphery of a cylindrical drive input element 40 formed on input housing 11. The clearance 36a is just sufficient to ensure that the arcuate outer periphery (indicated at 28a) of each follower 28 can abut the inner peripheral surface (40a) of the drive input element 40. The grooves 39 provide support for the followers 28 at least adjacent their axial ends and preferably, as shown, for substantially their entire length.

Figure 3:
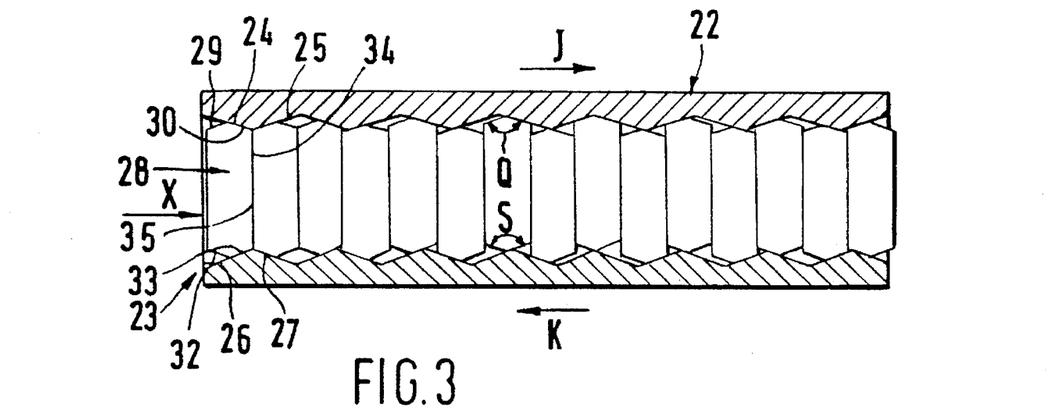
FIG. 3 is a development of cam surfaces with cam followers shown in positions therebetween.

As apparent from FIG. 2 and 3, the assembly of the cam followers is preferably such as to place the side surfaces 34, 35 of adjacent followers so that they interengage or lie closely adjacent. In that way maximum use is made of the available circumferential space for the cam followers, the followers together forming a substantially continuous and compact annular array as viewed in FIG. 2.

When driven input is applied through drive input element 40, and assuming that a vehicle having the differential is being driven in a straight line, the cam followers apply a load to the surfaces of cams 22, 23 so as to rotate the output members 16, 17 at equal speeds. As apparent from FIG. 3, alternate followers are in driving engagement with surfaces 24,26 of the cams. However intermediate cam followers have their surfaces in non-driving engagement with surfaces 25,27 of the cams.

The driving force applied by the followers 28 to the inclined surfaces 24,26 produces a reaction force F as illustrated in FIG. 4. The inclination of the end surfaces of the cam followers at angle P and P2 causes the application of force F to create an outward force G. FIG. 4 shows the forces for cam 22 with an end surface inclination of angle P. Forces F and G produce a resultant force R which passes radially outboard of edge E preferably approximately through or adjacent a corner C1 between the drive dog 36 and an adjacent outer peripheral part 40a of the follower 28. In that way the loading on the cam follower tends to wedge it firmly against a corner C2 of the drive input element 40 in such a way that tipping of the follower about its edge E is avoided.

The differential effect can best be appreciated considering the driving element 40 as being stationary and by applying contra rotary movement to the cams 22,23 in directions J,K respectively in FIG. 3. The cam surfaces 26 will move to the left and cam surfaces 24 to the right. Such movement of the cam surface 26 causes the associated follower to move axially towards cam 22. If both cams 22,23 and the drive input element 40 are all given an additional rotational movement in direction of arrow J, it will be appreciated that the cams 22 and 23 will be rotating respectively faster and slower than element 40. The difference in speeds between the two cams 22,23 and the drive input element 40 will result from the different number of cam surfaces on the cams. As there is a considerable amount of friction between the followers and the cams, torque will be transmitted to one cam even when the other is drivably connected to a wheel spinning on a slippery surface, which is highly advantageous over conventional differential systems.

The moving of one wheel faster than the other will result in a reduction in net torque applied to that wheel through the associated cam due to the load applied by the axially moving cam followers, to which input torque is applied. There will be, in that case, an increase in the hen torque applied at the other cam and the ratio between the hen torques will be dependent upon the values of the angles Q,S. The greater the angles, the greater will be the friction at the cam surfaces due no axial loading applied thereto by the followers. The angles Q,S are normally selected whereby the face cams may drive the cam followers, but the cam followers cannot drive the face cams. However, if desired, the angles Q,S can be selected to provide a degree of reversibility.

As mentioned above, the adjacent cam followers may be arranged with their side surfaces 34,35 closely adjacent or in inter-engagement, driving force F applied to any follower 28 in non-driving engagement with cam surfaces may be arranged to transmit driving load applied thereto to the next driving follower through the interengaging surfaces. Also the use of interengaging surfaces further inhibits the cam followers tipping relative to the cams.

Interengagement of the surfaces will take place over substantially their entire length.

The torque ratio requirement between the two net torques of the inside and outside output shafts is higher in some applications than others. Where high torque differentials are required say from 3:1 to 5:1 this can cause problems with wear rates between the cam followers and the cam surfaces.

Axial thrust applied to the cams by the followers is transmitted to the hub members 13 and 14 through the back face 52 of the cam members 16,17 via the thrust washers 51 and needle bearings 53. Shims may be used to adjust the relative axial positions of the cams. A belleville washer 54 (shown compressed into a flat configuration in FIG. 1) may be arranged to act against a bearing washer 55 to urge the followers 28 into firm engagement with the cams 22,23. The urging of the followers against the cams also creates a radially outward force Z on the followers 28 resulting from the angles of inclination P and P2 and in addition helps to reduce backlash.

The needle bearings 53 could be replaced by thrust washers.

Figure 5:
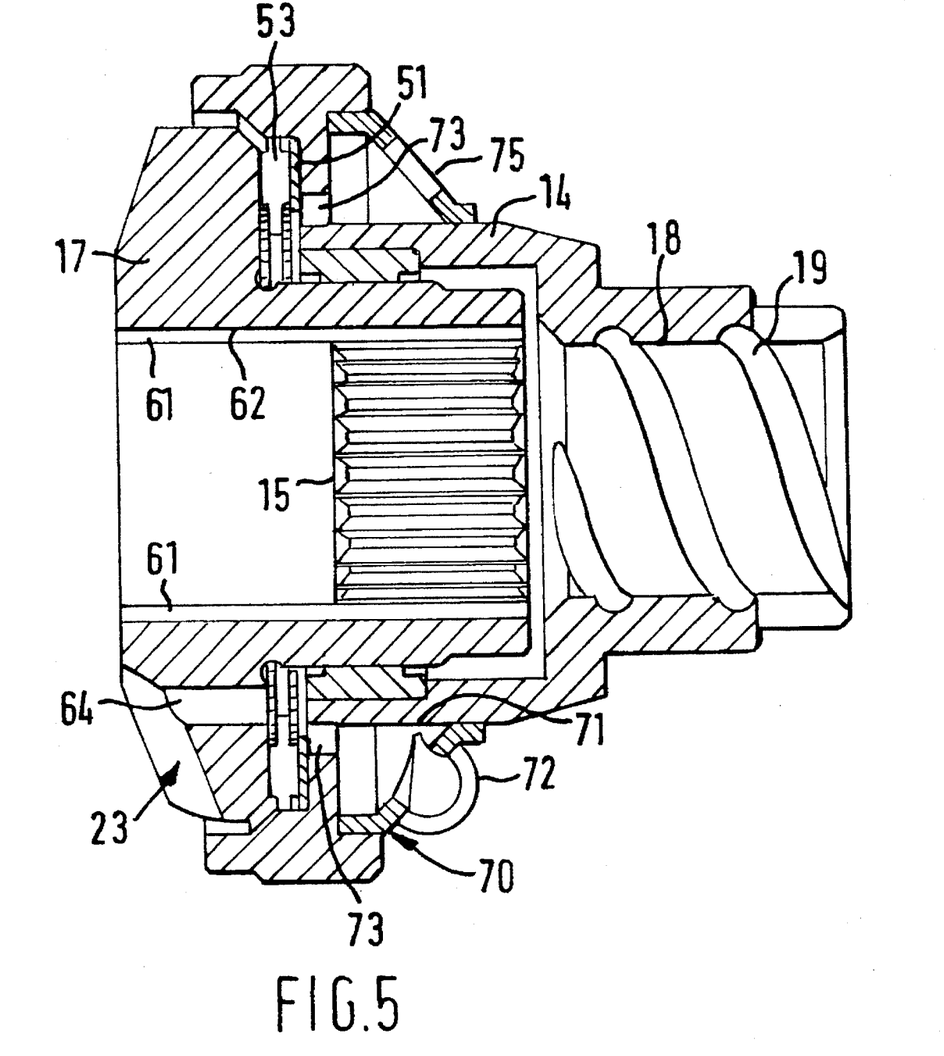
FIG. 5 is an enlarged section through a single output cam member and the adjacent portion of the input element as shown in FIG. 1 taken on the line V—V of FIG. 7.
Figure 6:
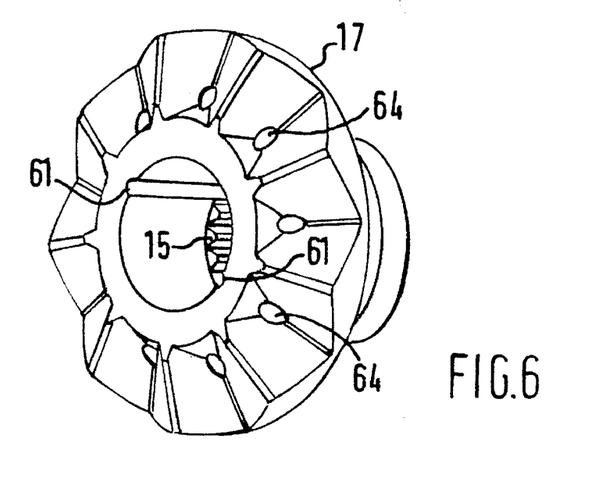
FIG. 6 is an isometric view of an output cam member as shown in FIG. 5.
Figure 7:
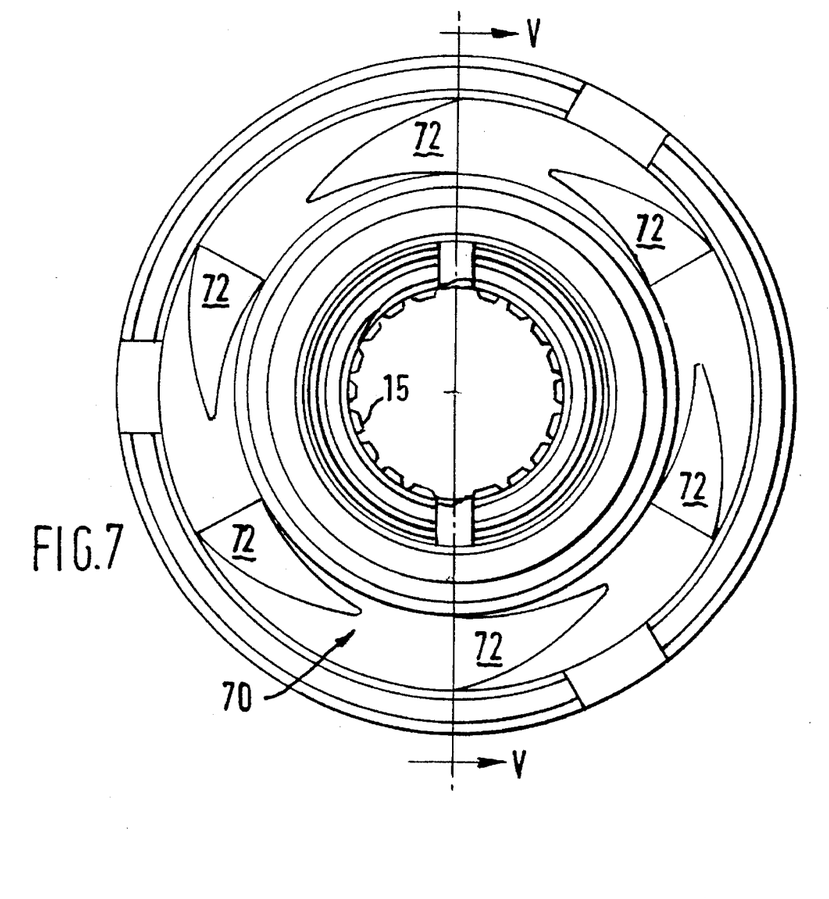
FIG. 7 is an end face view of the input element shown in FIG. 5 showing the oil pump means.

Now with reference also to FIGS. 5,6 and 7, both cam members 16,17, only one of which is shown for convenience, have axially extending oil passageways 61 arranged on the internal surfaces of the central bore 62. The passageways 61 pass the whole length of the bore 62 and at one end thereof open radially into the splines 15.

A second set of oil passageways 64 connect the face cam surface 23 to the backface 52 of the cam member 17. The passageways 64 open into the troughs between pairs of mutually inclined surfaces 24,25.

The face cam surface 23 can be surface treated by peening the surface by shot blasting before any subsequent hardening treatment. The shot blasting lasts for upto 1 minute with spring steel cut wire shot, of a length of 0.7 mm and a diameter of 0.7 mm. This has the effect of creating little oil reservoirs on the cam surface.

After case hardening the surface may be further treated by a nitrocarburizing process. The surfaces of the output cam members 16 and 17 are treated by a salt bath nitrocaburizing process. A suitable process is the "SURSULF" process (trade mark of Hydromechanique et Frottement, France). Alternatively the cam members 16 and 17 may be treated by nitro carburizing only after case hardening.

After nitrocarburizing the back faces 52 of the cam members 16,17 are induction hardened up to a hardness of Rockwell 60.

At least one of the hubs 13 and 14, is provided on its axially outer external surface 71 with an oil pump means 70. The oil pump means is formed from a sheet metal conical pressing 75 with at least one shell like oil scoop 72, and preferably six scoops, which pump oil into the differential housing 11. The scoops 72 are connected to the interior of the housing 11 by oil passageways 73 which pass axially through the hub member 14 and provide oil flow for passageways 64 and radially through needle bearings 53 to locations radially outboard of flanges 20 and 21. Both hub members 13 and 14 may be provided with similar oil pump means 70.

Figure 8:
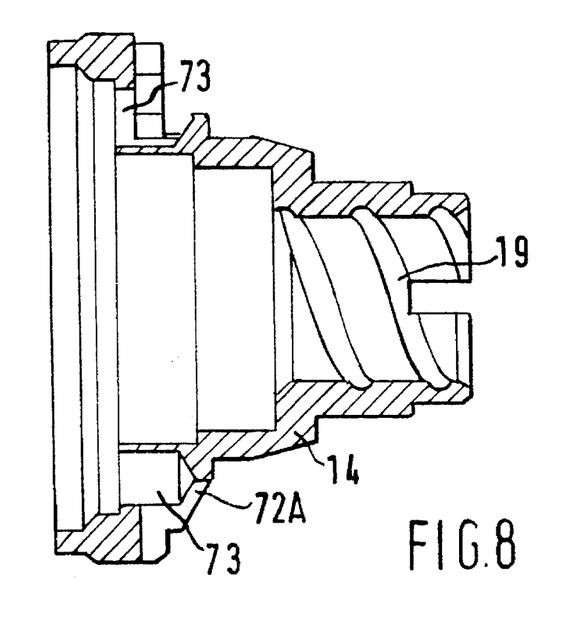
FIG. 8 is a section through a portion or an alternative input element with integral oil pump means.
Figure 9:
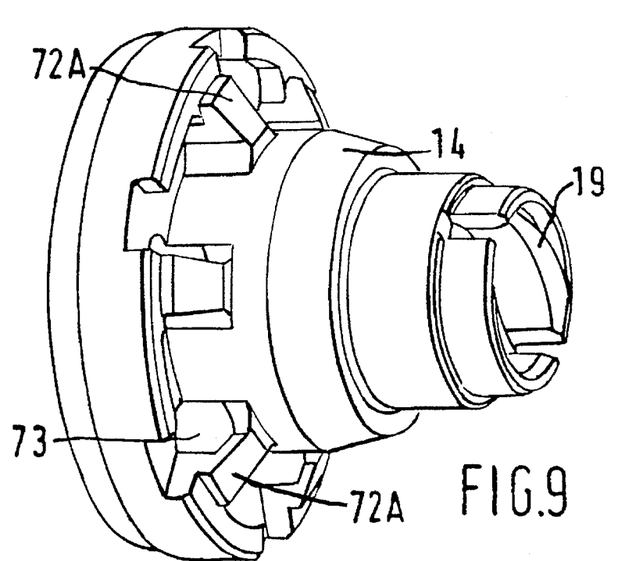
FIG. 9 is an isometric view of the portion of the input element shown in FIG. 8.

In another embodiment of the invention shown in FIGS. 8 and 9, the scoops 72A are integrally formed with the input member 14. In this case the scoops 72A are basically radial abutments which push the liquid towards the passageways 73.

Figure 10:
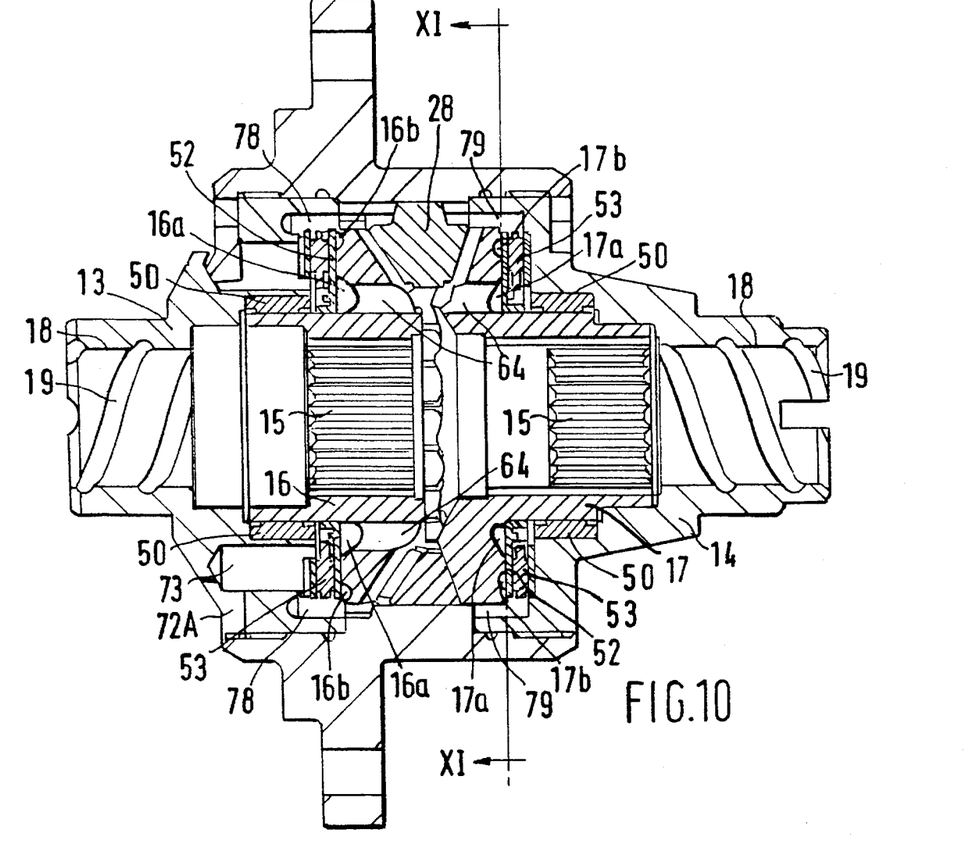
FIG. 10 is a section through a modified form of differential.
Figure 11:
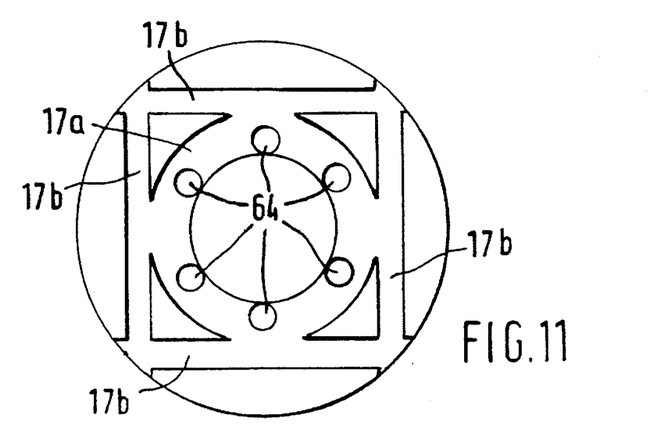
FIG. 11 is a view on the line XI—XI of FIG. 10 showing lubrication grooving details.

FIGS. 10 and 11 show a modified construction which the rear faces 52 of the output cam member 16 and 17 are provided with an annular groove 16a, 17a which links up the passageways 64. Chordally disposed grooves 16b, 17b are also provided on the rear face of each output member to link up the annular grooves 16a, 17a the passageways 64 and annular oil volumes 78, 79 radially outboard of the cams. As will be appreciated grooves 16a, 17a; 16b,17b promote the flow of oil whenever output members 16 and 17 rotate relative to the surrounding components.

Figure 12:
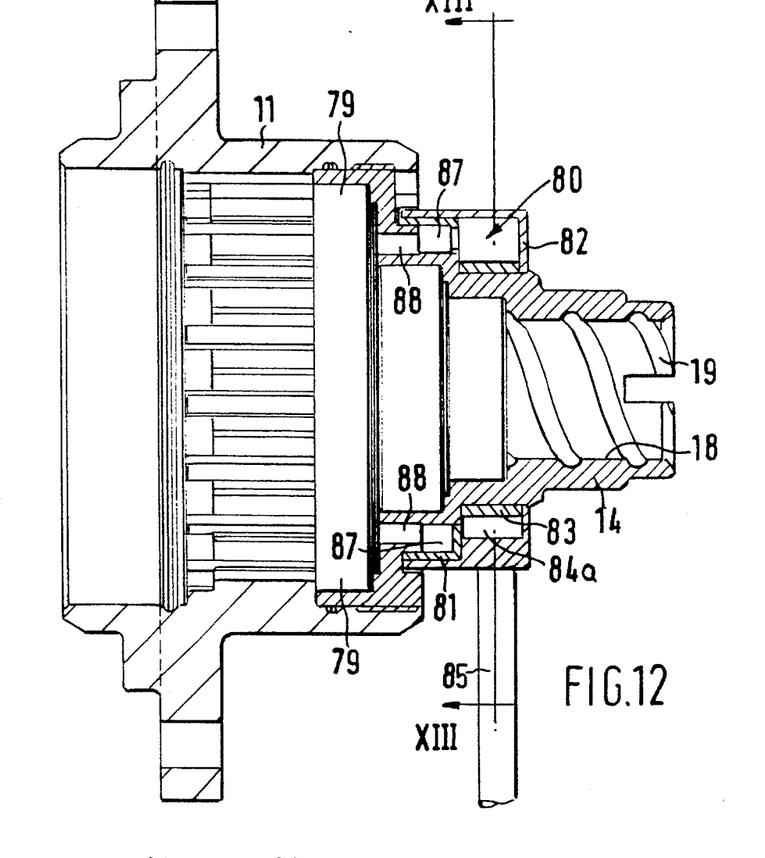
FIG. 12 is a section through a portion of an alternative input element which drives an oil pump.
Figure 13:
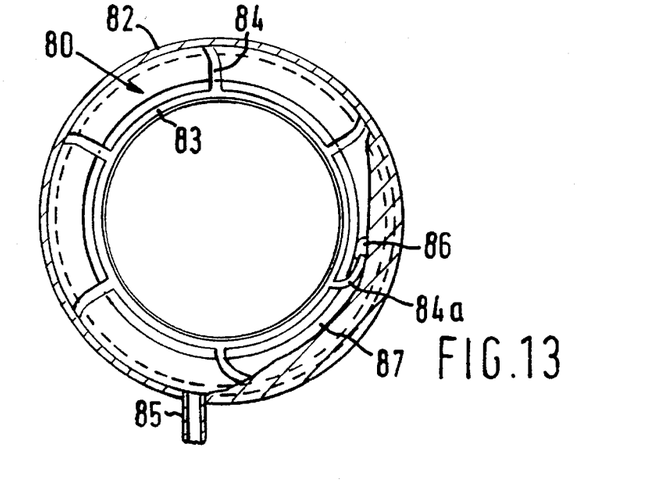
FIG. 13 is a view on line XIII—XIII of FIG. 12 showing details of the oil pump housing and impellor.

FIG. 12 and 13 show a further alternative embodiment of the present invention in which the external scoops 72,72A of the previous embodiments are replaced by a pump 80 which surrounds and is driven from the hub 14.

Pump 80 comprises a non rotatable housing having an inner part 81 and an outer part 82 and an impellor having a central cylindrical band 83 which encompasses the hub 14 and vanes 84 which extend radially outwardly from the band at circumferentially spaced locations. The impellor is moulded from rubber or plastics material so that vanes 84 are flexible.

As can be seen from FIG. 13 a pick-up pipe 85 which receives oil from within the surrounding casing provides the inlet to pump 80 and also, by its connection with a non-rotating portion of the differential, resists any tendency for the pump housing to rotate.

An exhaust port 86 from the pump housing is connected with an annular collection reservoir 87 from which extend passageways 88 which are the equivalent of passageway 73 in the earlier embodiments. Between inlet pipe 85 and exhaust port 86 the cross section of the pump decreases at 87 to produce the change in volume which provides the pumping action. The pump vanes flex, as shown at 84a, when passing through the decreased cross-section portion 87 of the pump.

The cylindrical band portion 83 of the impellor may be a friction grip on limb 14 or may be positively driven by interengaging formations on the band and hub or by other fasteners between the band and hub.

The pump 80 is designed to fill the differential with oil and maintain a steady flow of oil through the differential on rotation of housing 11. Oil flowing through passageways 88 enters groove 17a and passageways 17b,64 in the adjacent output cam member 17 (see FIGS. 10 and 11) to flow to the cam surfaces 22,23 via passageways 64 and reach the oil volumes 78,79 radially outboard of the cams via bearings 53. Oil then flows radially inwardly through passageways 64 in the other output cam member 16 to again reach cam surfaces 22,23. Oil exits from the differential radially inwardly between cams 22,23 where it flows axially outwardly along passageways 61 and helical feed grooves 19.

We claim:

1. A differential mechanism (10) comprising two output cam members (16, 17) rotatable about an axis (A), each said member having an annular cam surface thereon of undulating form comprising pairs of mutually inclined surfaces (24, 25, 26, 27), and a plurality of cam followers (28) having end surfaces (29, 30) engaging the cam surfaces of the output cam members, the arrangement being such that relative contra rotation of said cam members (16, 17) causes the cam followers to slide axially, and an input element (11–14) engaging and supporting the followers (28) and moving the followers circumferentially relative to the output cam members, characterised in that the output cam members (16, 17) have oil passageways (61, 64) formed therein.

2. A differential mechanism (10) comprising two output cam members (16,17) rotatable about an axis (A), each said member having an annular cam surface thereon of undulating form comprising pairs of mutually inclined surfaces (24,25,26,27), and a plurality of cam followers (28) having end surfaces (29,30) engaging the cam surfaces of the output cam members, the arrangement being such that relative contra rotation of said output cam members (16,17) causes the cam followers to slide axially, and an input element (11–14) engaging and supporting the followers (28) and moving the followers circumferentially relative to the output cam members, characterized in that a component (11,14) of the differential which rotates during use of the differential drives oil pump means (70) for forcing oil into the differential and wherein the oil pump means (70) comprises scoops (72) arranged externally on the component (11,14) which rotates and is connected to oil passageways (73) through the component (14).

3. A differential as claimed in claim 2 wherein the component which rotates and which drives the oil pump means (70) is the input element (11,14) of the differential.

4. A differential as claimed in claim 3 wherein the scoops (72A) are formed integrally with the input element (14).

5. A differential as claimed in claim 3 wherein the output cam members (16,17) are connected to output drive shafts which pass through bores (18) in the input element (13,14), and said bores each have a helical oil feed groove (19) therein.

6. A differential as claimed in claim 2 wherein the output cam members (16,17) have oil passageways (61) formed therein.

7. A differential as claimed in claim 6 wherein the two output cam members (16,17) each have splines (15) at the centre thereof for driving output drive shafts, and there is at least one axially extending oil passageway (61) also arranged at the centre of each cam member and which passes through the splines.

8. A differential as claimed in claim 6 wherein the annular cam surface on each output cam member (16,17) is connected to the oil pump means (70, 72) by axial oil passageways (64) extending from at least some of the troughs between pairs of inclined cam surfaces to an axially outer surface (52) of the respective output cam member.

9. A differential as claimed in claim 8 wherein the axially outer surface (52) of each output cam member (16,17) is provided with an annular groove (16a, 17a) which provides an oil flow link between the axially outer ends of each axial oil passageway (64).

10. A differential as claimed in claim 9 wherein the axially outer surfaces (52) of each output cam member (16,17) is provided with chordally disposed grooves (16b,17b) which provide an oil flow link between the annular groove (16a, 17a) and the outer periphery of each output cam member (16,17).

11. A differential as claimed in claim 2 wherein the oil pump means comprises an oil pump (80) driven by the component (14) which rotates.

12. A differential as claimed in claim 11 in which the oil pump (80) delivers oil to at least some of the troughs between pairs of inclined cam surfaces (24,25;26,27) via axially extended passageways (64) in the output members.

13. A differential as claimed in claim 11 wherein the oil pump (80) surrounds and is driven from part of the input member (14).

14. A differential as claimed in claim 13 wherein the oil pump (80) comprises a non-rotatable housing (81,82) containing an impellor (83,84)) mounted on an outer surface of the input member.

15. A differential as claimed in claim 14 wherein the housing (81,82) has an inlet (85) and an outlet (86) and the cross section of housing decreases (87) between the inlet and outlet to produce the pumping action.

16. A differential as claimed in claim 15 wherein the pump outlet (86) is connected with an annular collection reservoir (87) which encircles the input member (14), the reservoir being in turn connected with axially extending passageways (88) in the input member.

17. A differential as claimed in claim 14 wherein the impellor comprises a central annular band (83) which encompasses the outer surface of the input member (14) and a plurality of air vanes (84) extending radially outwardly from the band at circumferentially spaced locations thereon.

18. A differential as claimed in claim 17 wherein the pump vanes (84) are formed from rubber or plastics material and bend as they pass through the decreased cross section (87) of the housing (81,82).

19. A differential as claimed in claim 14 wherein the pump inlet is provided by an inlet pipe (85) which is secured at one end to a non-rotatable component and at the other end to the pump housing (81,82), said inlet pipe thus also serving to prevent rotation of the housing during use of the differential.

20. A differential mechanism (10) comprising two output cam members (16,17) rotatable about an axis (A), each said member having an annular cam surface thereon of undulating form comprising pairs of mutually inclined surfaces (24,25,26,27), and a plurality of cam followers (28) having end surfaces (29,30) engaging the CAM surfaces of the output cam members, the arrangement being such that relative contra rotation of said output cam members (16,17) causes the cam followers to slide axially, and an input element (11–14) engaging and supporting the followers (28) and moving the followers circumferentially relative to the output cam members, characterized in that a component (11,14) of the differential which rotates during use of the differential drives oil pump means (70) for forcing oil into the differential and wherein the oil pump means comprises an oil pump (80) driven by the component (14) which rotates.

21. A differential as claimed in claim 20 wherein the output cam member (16,17) have oil passageways (61) formed therein.

22. A differential as claimed in claim 21 wherein the two output cam members (16,17) each have splines (15) at the center thereof for driving output drive shafts, and there is at least one axially extending Oil passageway (61) also arranged at the center of each cam member and which passes through the splines.

23. A differential as claimed in claim 21 wherein the annular cam surface on each output cam member (16,17) is connected to the oil pump means (70,72) by axial oil passageways (64) extending from at least some of the troughs between pairs of inclined cam surfaces to an axially outer surface (52) of the respective output cam member.

24. A differential as claimed in claim 23 wherein the axially outer surface (52) of each output cam member (16,17) is provided with an annular groove (16a,17a) which provides an oil flow link between the axially outer ends of each axial oil passageway (64).

25. A differential as claimed in claim 24 wherein the axially outer surfaces (52) of each output cam member (16,17) is provided with chordally disposed grooves (16b, 17b) which provide an oil flow link between the annular groove (16a,17a) and the outer periphery of each output cam member (16,17).

26. A differential as claimed in claim 20 wherein the output cam members (16,17) are connected to output drive shafts which pass through bores (18) in the input element (13,14), and said bores each have a helical oil feed groove (19) therein.

* * * * *